Patented Aug. 11, 1953

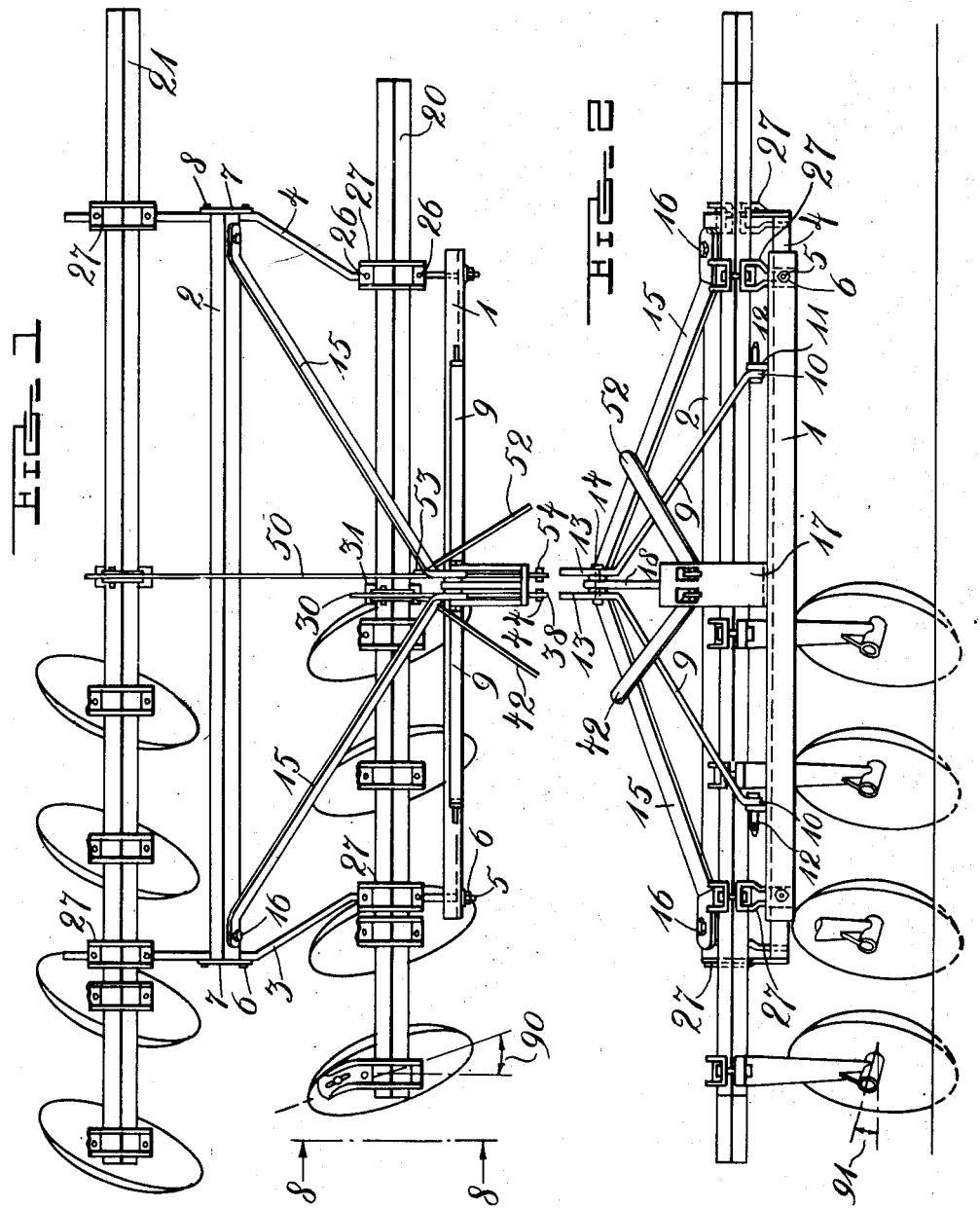

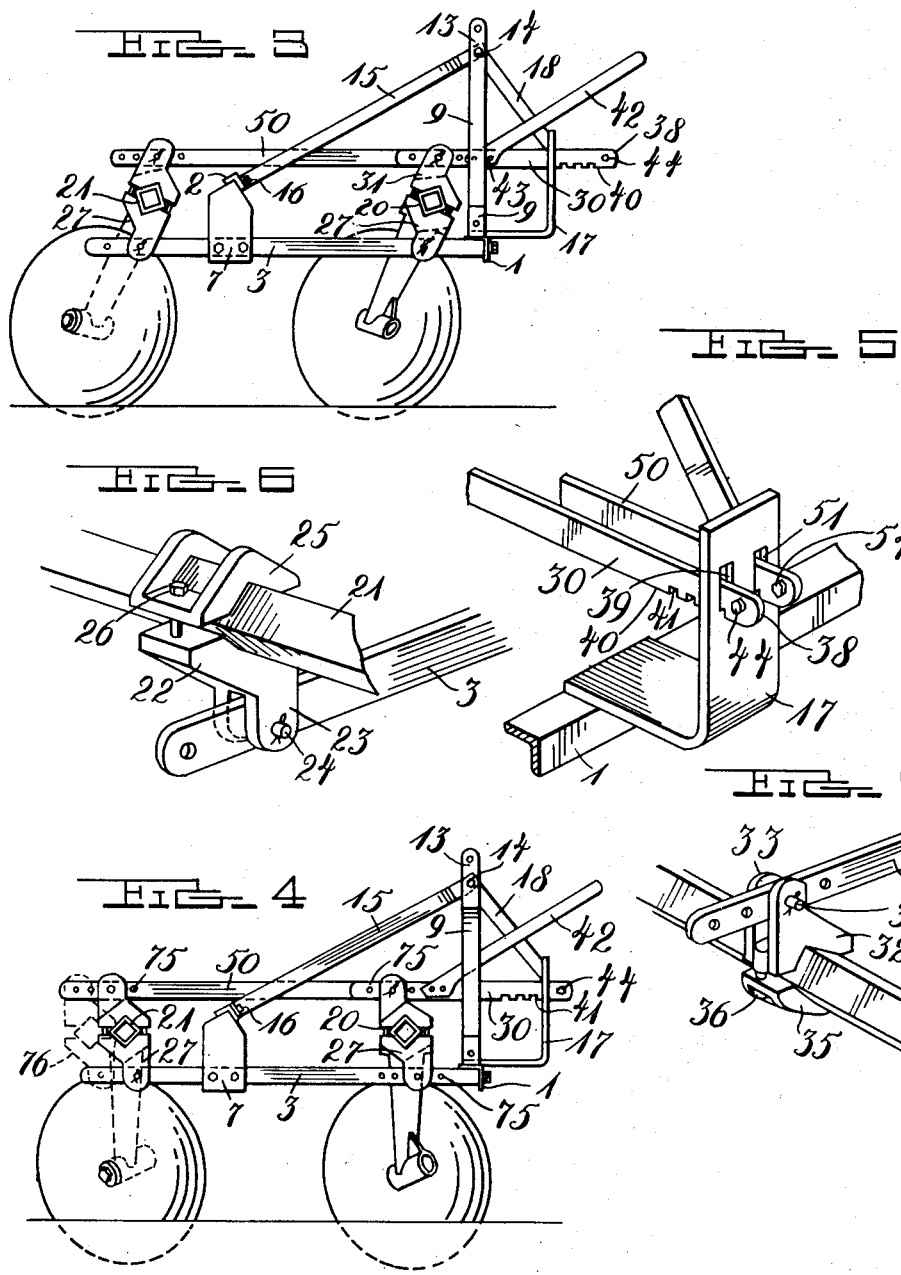

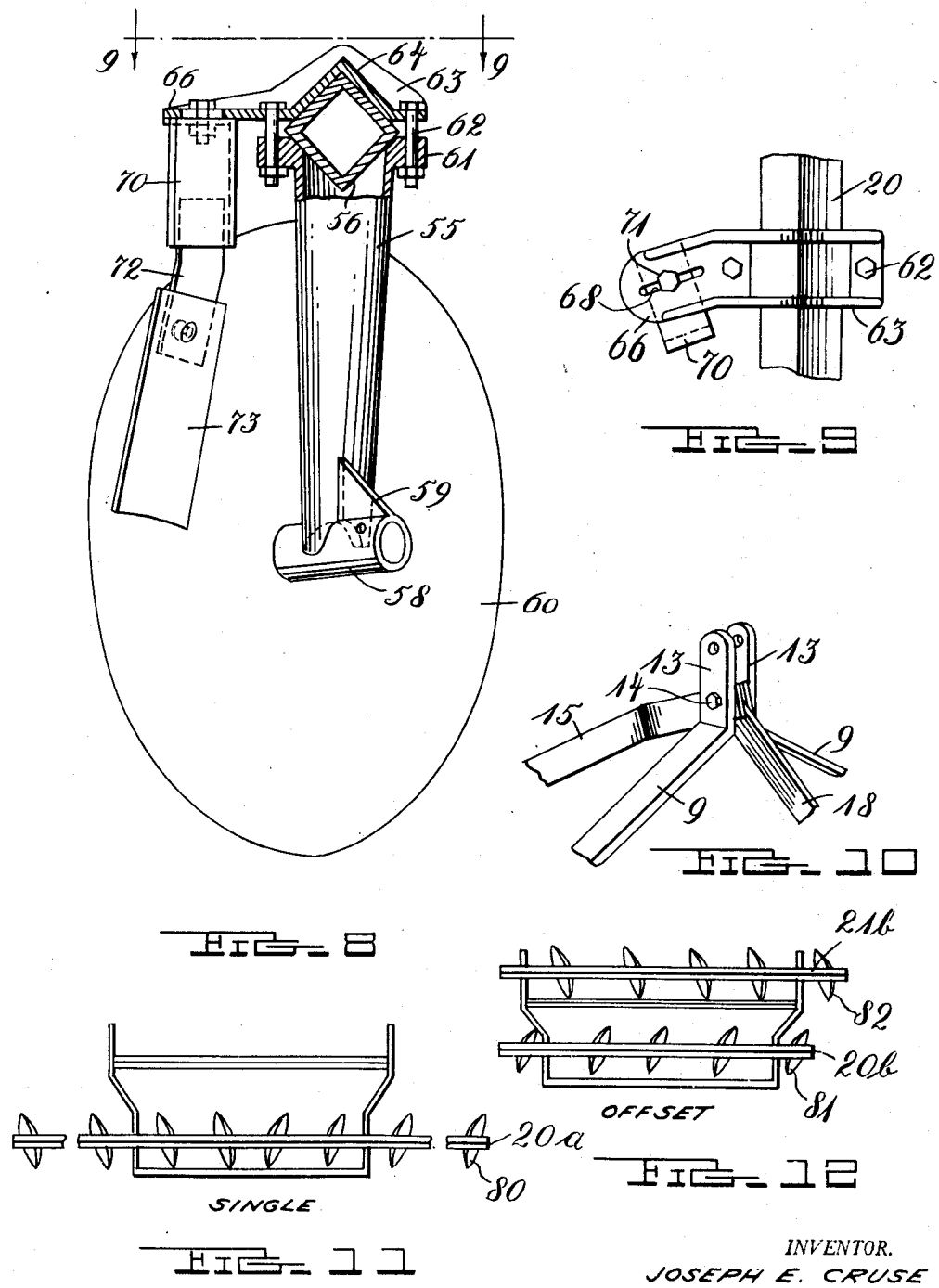

2,648,184

UNITED STATES PATENT OFFICE 2,648,184

DISK HARROW

Joseph E. Cruse, Omaha, Nebr., assignor of one-half to William Payne, Omaha, Nebr.

Application October 9, 1951, Serial No. 250,501

21 Claims. (Cl. 55—30)

This invention is directed to an improved construction for soil working implements of the disk harrow type, the improvements incorporated in the construction consisting principally in an improved mounting for the disk blades of the implement which results in better soil working action and which makes possible an improved and simplified construction for adjusting their soil working angle; an improved construction for mounting the disk gangs of the implement to the frame thereof; and an improved construction for connecting the disk blades to the disk gang supporting member.

The improvements of the invention for connecting the disk blade to a supporting member for forming a gang assembly, and for connecting such gang assembly to the frame of the implement result in an implement having great flexibility in the sense that the number of blades and gang arrangement can be varied to suit the particular soil working conditions encountered. In this respect, various types of agricultural operations and soil conditions existing throughout the country have resulted in the development and employment of a number of distinct types of disk harrow. Perhaps the most important of these are the single action harrow, which consists of a single row of two gangs with each gang arranged to work the soil in opposite directions from the center of the implement; the tandem harrow, which consists of two rows of two gangs each arranged in a manner similar to that of the single harrow but with the gangs of the rear row facing oppositely from those of the front row; and the offset harrow, which commonly consists of two rows of one gang each, the rear gang facing oppositely from the front gang. The improvements incorporated in the construction of the harrow of the invention permit the implement to be readily arranged as any one of the above types of harrow.

The implement of the invention is designed primarily as a lift-type, that is, one for use with one of the modern tractors incorporating a liftable hitch which permits the implement to be raised clear of the ground, and which in some cases permits the implement to be lowered to any working depth desired up to the maximum depth obtainable.

The nature of these improvements will be specifically explained by a description of the harrow construction illustrated in the accompanying drawings, which incorporates these improvements and constitutes a presently preferred embodiment of the invention. These drawings consist of the following views:

Fig. 1, a plan view of a disk harrow of the invention, arranged in conventional tandem form, with the disks (not shown) to the right of longitudinal center line of the implement being arranged similarly but with opposite throw to those shown to the left of the center line;

Fig. 2, a front elevation of the structure shown in Fig. 1;

Fig. 3, a side elevation of the structure shown in Fig. 1 illustrating the position occupied by the gangs of the harrow when disposed at minimum cutting angle;

Fig. 4, a side elevation similar to Fig. 3 but showing the position occupied by the gangs when disposed at maximum cutting angle;

Fig. 5, a perspective view of the construction of the front central portion of the harrow showing the relationship between the gang positioning bars and the implement frame;

Fig. 6, a perspective view showing one of the connections between one of the gang frame bars and a longitudinal frame member of the harrow, a connection between the rear gang bar and frame being shown in this view;

Fig. 7, a perspective view showing the connection between one of the disk gang supporting members and its positioning bar;

Fig. 8, a sectional elevation taken along the line 8—8 of Fig. 1 showing the construction and mounting of one disk blade standard;

Fig. 9, a plan view taken in the direction 9—9 of Fig. 8;

Fig. 10, a perspective view showing the construction of the upper front portion of the harrow frame;

Fig. 11, a plan view schematically illustrating the harrow of the invention arranged in a conventional single action form; and Fig. 12, a view similar to Fig. 11, showing the harrow arranged in conventional offset form.

Referring first to Figs. 1, 2, and 3, the harrow construction consists generally of a frame composed of a front transverse member 1, a rear transverse member 2, and left and right longitudinal members 3 and 4, respectively. The transverse members 1 and 2 are each formed from angle stock, while the longitudinal members 3 and 4 are formed of bar stock and have a stud 5 projecting from their front end, which together with a nut 6 serves to secure the front end of these longitudinal members to the vertical flange of the front transverse member 1. A downwardly depending bracket 7 is welded to each end of the rear transverse member 2, these brackets being connected to the longitudinal members 3 and 4 by bolts 8.

This frame is braced by a superstructure which also serves to provide an upper hitch point and which consists first of a pair of members 9 which extend generally vertically in the plan view of Fig. 3 and upwardly and inwardly in the front elevation of Fig. 2. The lower downturned end 10 of each of these members is connected to a lug 11 on the front frame member 1 by a connector 12 which also serves as a hitch point for the implement. The upper parallel ends 13 of each of these members 9 are connected by a bolt 14 which also unites the remaining members forming this superstructure. These remaining members comprise a pair of downwardly and rearwardly extending braces 15, each extending from their point of connection with the bolt 14 to a point adjacent an outer end of the rear transverse frame member 2 to which they are each connected as by a bolt 16. The superstructure is completed by an L-shaped bracket 17, welded to the upper surface of the horizontal flange of the front transverse member 1 at the center of the implement, and extending forwardly and upwardly therefrom. A brace 18 is connected between the upper portion of the bracket 17 and the bolt 14.

The transverse, longitudinal and superstructure frame members together form a unitary frame structure for the implement. A gang of the implement consists of a number of disks individually carried by a supporting bar which acts as a frame for the gang and which in turn is carried by the implement frame construction. Gang frames are commonly referred to in the art as subframes of the implement.

A front gang supporting bar 20 and a rear gang supporting bar 21 are used in the tandem construction illustrated. These supporting bars are preferably of square cross section and each is pivotally connected at two points to the longitudinal frame members 3 and 4 by a bracket construction shown in perspective in Fig. 6. This bracket is of split construction and consists of a member 22 having a clevis end 23 adapted to be pivotally secured to one of the frame members 3 or 4 by a pivot pin 24. The other half of the bracket consists of a cap 25 adapted to be connected to the member 22 by bolts 26. Both the cap 25 and base 22 of the bracket are formed with a V-shaped notch, shaped to engage the sides of the gang supporting bar.

Thus the connection of each supporting bar to the frame by two of the brackets, which are generally designated by the reference 27 in Figs. 1 to 4, mounts each supporting bar for pivotal movement about an axis, formed by the pins 24 of the brackets, which lies transverse of the implement and generally horizontal when the implement is in normal working position. Pivotal movement of a supporting bar about this axis is utilized to vary the effective soil working angle of the gang in a manner that will be more fully explained hereinafter.

Referring to the front supporting bar 20, its position about this transverse axis is defined by a positioning bar 30, connected to the bar 20 at about the longitudinal center line of the implement by a bracket generally designated by the reference 31 in Figs. 1 to 3, and preferably consisting of parts identical to those employed in the construction of the brackets previously described for connecting the bar to the longitudinal frame members. This connection is shown in the perspective view of Fig. 7, and it can be seen by comparing the construction of the bracket there shown with that illustrated in Fig. 6 that the construction is the same although the position of the bracket is inverted. Thus, the base 32 of this positioning bar bracket is formed with a clevis end 33 adapted to engage the positioning bar 30 and be pivotally connected thereto by a pin 34. The cap 35 of this bracket is secured to the base by a pair of bolts 36, and both cap and base are formed with V-shaped notches to engage the sides of the supporting bar.

The forward end 38 of the positioning bar 30 projects through an aperture 39 formed in the vertical portion of the bracket 17 and the lower edge 40 of the positioning bar is formed with a series of spaced notches 41 each dimensioned to engage the thickness of the material of the bracket member 17.

An operating handle 42 is connected to the positioning bar 30 at an intermediate point as by bolts 43, and this handle extends forwardly, upwardly and outwardly through the aperture formed between the superstructure brace members 9. A bolt 44 is used in the outer end of the bar 31 to act as a stop to prevent the bar from becoming disengaged with the bracket member 17.

The mounting of the rear gang supporting bar 21 is identical to that previously described, a pair of brackets 27, each pivotally connected to one of the longitudinal frame members 3 and 4, being employed for this purpose. Pivotal movement of the rear supporting bar 21 is controlled by a positioning bar 50, which is pivotally connected to the bar 21 by a bracket identical to that shown in Fig. 7 and previously described, and which extends forwardly and through a second aperture 51 formed in the vertical face of the L-shaped bracket 17 (Fig. 5). An actuating handle 52 (Figs. 1 and 2) is connected to the bar 50 as by bolts 53, and serves to control the engagement of notches formed in the under side of the bar and corresponding to the notches 41 in the positioning bar 30. A bolt 54 is also used in the forward end of the bar 50 as a stop.

As previously mentioned, each disk is an individual self-contained unit, and the construction of one of these units is perhaps best illustrated in Fig. 8. This unit consists of a disk standard assembly, a scraper assembly and a disk blade. The disk standard assembly is made up of a standard 55 of tapered, tubular construction, provided with a V-shaped notch 56 at its upper end and a semicircular notch 57 at its lower end. A tubular bearing member 58 is welded in position within the semicircular notch 57 and additionally braced to the standard 55 by a gusset 59. The disk blade 60 is carried from the bearing member 58 by an axle and bearing which are of conventional construction and hence are not shown in detail. A pair of lugs 61 are formed at the top of the standard 55 and are drilled to receive bolts 62 which connect a clamping member or cap 63 to the lower portion of the standard. This cap is also formed with a V-shaped notch 64 and with a curved tail piece 66 (Fig. 1). An elongated slot 68 is formed in the tail piece 66.

The scraper assembly consists first of an L-shaped bracket 70 (Figs. 8 and 9) adapted to be secured to the tail piece 66 of the cap member 63 by a bolt 71 extending through the slot 68 thereof. A flexible strap 72 is welded to the bracket 70 and supports a scraper blade 73.

Adjustment of the soil-working angle of the disk gangs by rotation of each gang supporting bar about its transverse pivotal axis is made possible by the employment of individual disk units and by the angular relationship of the axle of each disk blade (defined by the axis of the tubular bearing member 58) with relationship to the disk standard 55. This bearing member 58 of each disk unit is mounted at a combined angle composed of one angle in a horizontal plane measured from a fore and aft reference line, and a second angle in a vertical plane measured from a generally transverse reference line. In the construction shown, a horizontal angle of about 22° (see angle 90 indicated in Fig. 1) is employed in combination with a vertical angle of about 9° (see angle 91 indicated in Fig. 2), these angles being measured with the disk standard 55 extending vertically. These two angles jointly define the effective working angle of the disk blade, and due to the combination of angles this effective working angle varies from minimum to maximum as the parts are changed from the position shown in Fig. 3 to the position shown in Fig. 4. This compound angle also results in the disk having a much more vigorous soil-working action.

In the construction illustrated the positioning bars and gang pivot points are arranged so that the effective working angle of the disks is adjusted by movement of the gang assemblies, comprising the gang supporting bar and disk units attached thereto, from a position where the disk standards are inclined rearwardly (Fig. 3) to a position where they are substantially vertical (Fig. 4). Confining the adjustment to the range shown keeps the frame structure of the harrow at maximum height from the ground, allows sufficient variation in effective soil-working angle for normal usage in view of the implement being a lift type, and also makes the adjustment easier to make because of the fact that the weight of the frame structure does not acquire a very great moment arm from the axles of the disk blades.

By reason of the construction of the disk standard assembly, each disc unit is secured to a gang supporting bar by a clamped engagement. Thus the number and spacing of disk units mounted on any gang supporting bar can be easily varied, as can the arrangement of the disk units for either right- or left-hand throw. In this connection, the disk units shown in Fig. 1 mounted on the front supporting bar 20 of the harrow are arranged for right hand throw—that is, they work the soil to the right of the direction of travel of the implement. The disk units on the rear supporting bar 21 are arranged for left hand throw and work the soil towards the left and center of the implement. Each gang supporting bar, being also assembled to the frame of the harrow with a clamp engagement, is thereby readily adjustable in transverse position.

Since the longitudinal position of each gang supporting bar is fixed merely by three pins, namely, the pins 24 of the pair of brackets 27 and the pin 34 of the positioning bar bracket, fore and aft, or longitudinal, spacing of the supporting bars 20 and 21 can be readily varied. In Figs. 3 and 4, a series of holes generally designated by the reference 75 are shown formed in the longitudinal frame member 3 and the positioning bars 30 and 50 for varying the longitudinal position and spacing of the supporting bars 20 and 21. One such alternate position of the rear supporting bar 21 is indicated in phantom in Fig. 4 and designated by the reference 76.

The disk supporting bars are preferably arranged above the longitudinal frame members as shown because this results in the implement having a more direct line of draft as can be seen by comparing the location of the connecting pins 12 to the location of the axles of the disks, the actual point of draft or soil reaction being below these axles.

Some indication of the flexibility of the construction described can be gained from an inspection of Figs. 11 and 12 of the drawings. Fig. 11 illustrates that a conventional single action type of harrow can be formed by removing the rear supporting bar 21 of the construction of Figs. 1 to 4 and employing a single supporting bar 20a which may be of any length desired. The number and spacing of disk units 80 mounted on the supporting bar 20a can also be as desired for the conditions encountered, though, naturally, the length of the bar and number of disk units would be limited by the strength of the implement frame members and capacity of the tractor with which the implement is to be used.

The implement can also easily be arranged in typical offset style as shown by Fig. 12. Again, the length of the supporting bars 20b and 21b can be as desired as can the number and spacing of the disk units 81 and 82 respectively mounted thereon, it being merely necessary to arrange the disk units 81 of the front supporting bar 20b to throw in one direction (left hand illustrated) and the disk units 82 of the rear supporting bar 21b to throw in the opposite direction. The disk units are actually made right and left hand, but a standard tandem harrow arrangement, such as illustrated in Fig. 1, can readily be converted to the offset type by merely reversing half of the disk units between the front and rear supporting bars so that all units mounted on each bar have the same direction of throw.

This application is a continuation in part of my prior copending application, Serial No. 762,330, entitled Disc-Angle Adjustment Means in Agricultural Appliances, filed July 21, 1947, now abandoned.

I claim:

1. A disk harrow having a frame, a row of ground-working disks individually rotatably mounted on their axes thereon, the axis of each disk being at a horizontal oblique angle to the direction of travel of the harrow, disk mounting means including a supporting member, means pivotally connecting said supporting member to said frame on an axis transverse of said harrow, means carried by and depending from said supporting member on which said disks are each rotatably mounted on their own axes with equal tilt angles to the vertical, and positioning means between said supporting member and said frame for retaining said supporting member in selected positions about the said pivotal axis thereof.

2. In a disk harrow having a main frame, a row of ground-working disks individually rotatably mounted thereon on their own axes, each disk being at a horizontal oblique angle to the direction of travel of the harrow, means for mounting said disks comprising a supporting member, means connecting said supporting member to said frame on a pivotal axis extending generally transversely thereof, a series of spaced members depending from said supporting member on which said disks are rotatably mounted with equal tilt angles to the vertical, and means extending between said supporting member and said frame for retaining said supporting member against pivotal movement in a plurality of selected positions.

3. A disk harrow as set forth in claim 2 wherein said supporting member comprises a straight bar pivotally connected to said frame at a right angle to the direction of travel of said harrow and on which disks are mounted in a straight row at a right angle to the direction of travel of the harrow.

4. A disk harrow as set forth in claim 2 wherein said means for retaining said supporting member includes a member rigidly secured to said supporting member and extending at an angle thereto, a link hinged to said extending member and means for fixedly connecting said link to a frame member at one of a plurality of positions longitudinal of said link.

5. A disk harrow as set forth in claim 2 wherein the means for retaining said supporting member against pivotal movement include an arm rigidly secured to said supporting member, and a positioning member hinged to said arm at a point spaced from the pivotal axis of said supporting member, and means for securing said positioning member to the frame of said harrow at a plurality of positions.

6. A disk harrow as set forth in claim 2 wherein the said horizontal oblique angle and the said vertical tilt angle of each disk are substantially 22½° and 9° respectively, when the said mounting member for such disk is in a position of depending substantially vertically from said supporting member.

7. A disk harrow as set forth in claim 2 wherein the said horizontal oblique angle and the said vertical tilt angle of each disk are substantially 22½° and 9° respectively when said supporting member is positioned so that said depending members are vertical and said supporting member carries positioning means engageable with said frame for rotating said supporting member so that said depending members may be disposed in positions other than vertical.

8. A tandem disk harrow having a main frame, a plurality of longitudinally spaced rows of ground-working rotary disks, each of said rows of said disks comprising a supporting member pivotally mounted on said frame on an axis transverse thereof, a series of spaced members depending from said supporting member, each of said disks being rotatably carried by one of said depending members with the axis of each disk being disposed at a horizontal oblique angle to the direction of travel of the harrow and at an acute tilt angle to the vertical, and means for retaining each of said supporting members in a plurality of selected positions about the pivotal axis thereof.

9. A disk harrow construction having a frame, a disk standard supporting bar, means pivotally connecting said supporting bar to said frame on an axis transverse thereof, a plurality of disk standards carried by said supporting bar, each of said disk standards having a disk blade rotatably secured thereto on an axis defining a compound soil-working angle of said disk blade, said soil-working angle extending at one angle to the path of travel of said harrow and at a second angle to the vertical, and means for varying said soil-working angle comprising means for fixing the relationship between said supporting bar and said frame in a plurality of positions of said supporting bar about the pivotal axis thereof.

10. A disk harrow as set forth in claim 9 wherein said means for pivotally connecting the supporting bar to said frame comprises a pair of brackets each having a point for pivotal connection to said frame and carrying clamp means for engaging said supporting bar whereby said supporting bar may be adjusted transversely of said frame.

11. A disk harrow as set forth in claim 9 wherein each of said disk standards carries clamp means for engaging said supporting bar whereby the spacing of said disk standards may be varied along said supporting bar.

12. A disk harrow construction having a main frame including a pair of spaced longitudinal members, a disk gang comprising a subframe, a plurality of disks carried by said subframe, each of said disks being individually rotatably mounted with the axis of each disk being positioned at one angle to a longitudinal horizontal reference line and a second angle to a vertical reference line, means for pivotally connecting said subframe to each of said longitudinal frame members on an axis transverse of said harrow, and means for fixing said subframe in any one of a plurality of selectable positions about the said pivotal axis thereof.

13. A disk harrow as set forth in claim 12 wherein said means for pivotally connecting said subframe to each of said longitudinal frame members are connectable to said longitudinal frame members in a plurality of positions longitudinal of said harrow.

14. A disk harrow as set forth in claim 12 wherein said means for pivotally connecting said subframe to said longitudinal frame members are connectable to said subframe at a plurality of positions longitudinal thereof.

15. A disk harrow having a main frame including a pair of longitudinal frame members arranged substantially equidistant from the longitudinal center line of said main frame; a disk gang comprising a supporting bar, a plurality of disk units, and means for clamping each disk unit to said supporting bar; a positioning bar extending substantially along the center line of said harrow and spaced above the level of said longitudinal frame members, said positioning bar being engageable with said frame at a plurality of positions; means for pivotally connecting said supporting bar to said longitudinal frame members and to said positioning bar, said means extending above and below said supporting bar whereby the latter is located substantially midway between said longitudinal frame members and said positioning bar, said connecting means carrying means for frictionally engaging said supporting bar.

16. A disk harrow as set forth in claim 15 wherein each of said disks is carried at an angle composed of one angle to a horizontal reference line and a second angle to a vertical reference line.

17. A disk harrow as set forth in claim 15 wherein said connecting means are pivotally attachable to said longitudinal frame members and said positioning bar at a plurality of longitudinally spaced points thereon.

18. A single action disk harrow construction comprising a main frame, a disk gang subframe pivotally connected to said frame on an axis transverse thereof, a plurality of disk units individually carried by said subframe, the disk units disposed to one side of the midpoint of said subframe having a soil-working angle opposite to those disposed to the other side of said midpoint, each of said disk units including a disk blade rotatably mounted on an axis defining said soil-working angle and extending at one angle to a longitudinal horizontal reference line and at a second angle to a vertical reference line, and means for fixing said subframe in any one of a plurality of selectable positions about the said pivotal axis thereof.

19. An offset disk harrow construction having a frame unit including a pair of spaced longitudinal frame members, a pair of disk gangs, each including a subframe, means for pivotally connecting each subframe to said longitudinal main frame members on an axis transverse of said harrow, said subframes being spaced longitudinally of said harrow, a plurality of disk units individually carried by each of said subframes, each of said disk units including a disk blade rotatably mounted on an axis defining an effective soil-working angle of such disk blade, said soil-working angle being composed of one angle to a longitudinal horizontal reference line and a second angle to a vertical reference line, the soil-working angle of the disk units carried by one of said subframes being opposite to the soil-working angle of the disk units carried by the other of said subframes, and means for fixing said subframes in any one of a plurality of selectable positions about the said pivotal axes thereof.

20. A disk harrow construction as set forth in claim 19 wherein the said means for retaining said subframes in selective pivotal position are connected to each of said subframes independently, whereby the pivotal position of one subframe may be varied from that occupied by the other subframe.

21. A disk harrow having a main frame including interconnected transverse and longitudinal members; a disk gang comprising a supporting bar, a plurality of disk units and means for clamping each disk unit to said supporting bar; a disk blade rotatably carried by each disk unit on an axis positioned to define a horizontal cutting angle and a vertical suction angle for such disk blade; a disk gang positioning bar extending longitudinally of said frame and engageable with said frame at a plurality of positions, means for pivotally connecting said supporting bar to said longitudinal frame members and to said positioning bar, said means extending above and below said supporting bar whereby the latter is located substantially midway between the level of said longitudinal frame members and said positioning bar, said frame members being lowermost, and said connecting means carrying means for frictionally engaging said supporting bar.

JOSEPH E. CRUSE.

References Cited in the file of this patent

UNITED STATES PATENTS

| Number | Name | Date |
|---|---|---|
| 556,356 | Lindstrand | Mar. 17, 1896 |
| 1,243,203 | Nelson et al. | Oct. 16, 1917 |
| 2,268,055 | Neisingh | Dec. 30, 1941 |